United States Patent
Jang et al.

(10) Patent No.: US 6,628,034 B2
(45) Date of Patent: Sep. 30, 2003

(54) BRUSHLESS DC MOTOR WITH ARMATURE WINDINGS COMPENSATED BY AUXILIARY WINDINGS

(75) Inventors: Gunhee Jang, Seoul (KR); Junghwan Chang, Seoul (KR); Kyungsu Kim, Milyang-si (KR)

(73) Assignee: Hanyang Hak Won Co., Ltd., Seoul (KR)

( * ) Notice: Subject to any disclaimer, the term of this patent is extended or adjusted under 35 U.S.C. 154(b) by 0 days.

(21) Appl. No.: 09/878,411

(22) Filed: Jun. 12, 2001

(65) Prior Publication Data

US 2002/0185929 A1 Dec. 12, 2002

(30) Foreign Application Priority Data

Mar. 30, 2001 (KR) ........................................ 2001-16847

(51) Int. Cl.[7] .............................................. H02K 21/00
(52) U.S. Cl. ...................... 310/210; 310/179; 310/180; 310/184
(58) Field of Search ................................ 310/210, 179, 310/180, 184, 195, 198, 156.01, 258, 254, 186, 190, 191

(56) References Cited

U.S. PATENT DOCUMENTS

| | | | | |
|---|---|---|---|---|
| 2,500,191 A | * | 3/1950 | Lee | 318/325 |
| 4,263,524 A | * | 4/1981 | Diederichs | 310/112 |
| 5,672,925 A | * | 9/1997 | Lipo et al. | 310/154 |
| 5,757,100 A | * | 5/1998 | Burgbacher | 310/186 |
| 5,844,343 A | * | 12/1998 | Horst | 310/184 |

* cited by examiner

Primary Examiner—Thanh Lam
(74) Attorney, Agent, or Firm—Greenblum & Bernstein, P.L.C.

(57) ABSTRACT

A brushless DC motor with armature windings is compensated by auxiliary windings wound around linking parts of each pair of adjacent teeth of the slotted stator, to increase the number of effective turns, thus improving the torque constant and efficiency of the motor. The motor includes a slotted stator formed with a number of teeth, main windings concentrically wound around the teeth of the stator, auxiliary windings for compensating the main windings wound concentrically around the linking parts of the teeth and connected to the main windings, and a rotor with permanent magnets and a yoke.

6 Claims, 9 Drawing Sheets

BRUSHLESS DC MOTOR WITH ARMATURE WINDINGS COMPENSATED BY AUXILIARY WINDINGS

FIELD OF THE INVENTION

The present invention relates to a brushless DC motor with armature windings compensated by auxiliary windings, and particularly to a brushless DC motor with armature windings compensated by auxiliary windings wound around the linking parts of each pair of adjacent teeth of the slotted stator to increase the number of effective turns, thus improving the torque constant and efficiency of the motor.

BACKGROUND OF THE INVENTION

Brushless DC motors are different from regular DC motors in having a rotating permanent magnet type. They have been widely used as typical motors for multimedia equipment used with computers, such as peripheral equipment (HDD, CD-ROM, DVD), video cassette recorders (VCR), camcoders. Also of late, they have been used for driving ultracompact portable information storage devices such as IBM microdrives developed by IBM Corp. In the case of using small precisional motors in high value-added products such as computer hard disk drives, fluid bearings are increasingly used instead of ball bearings as the former is excellent in mechanical characteristics which reduce noise and vibration. However, the use of fluid bearings requires bigger torque than that of ball bearings during starting period, due to the viscosity and consequent friction of the fluid.

FIG. 1a is a plan view showing a brushless DC motor of the inner rotor type with twelve poles and nine slots, and FIG. 1b is a plan view showing a brushless DC motor of the outer rotor type with twelve poles and nine slots, according to a prior art. As shown in FIG. 1a and FIG. 1b, the motor is classified into the inner rotor type and outer rotor type based on the relative position of the rotor 40 with permanent magnets and the stator 10 with slots between each pair of adjacent teeth.

The brushless DC motor of the inner rotor type comprises a stator 10, a rotor 40 inside the stator, and air gaps 30 between the stator and the rotor. The stator comprises nine contiguously formed teeth 11, main windings 20 wound around the nine teeth 11 of the stator 10, and the rotor comprises twelve poles of permanent magnets 41 and a yoke 42.

The brushless DC motor of the outer rotor type comprises a stator 10, a rotor 40 outside the stator, and air gaps 30 between the stator and the rotor. The stator comprises nine contiguously formed teeth 11, main windings 20 wound around the nine teeth 11 of the stator 10, and the rotor comprises twelve poles of permanent magnets 41 and a yoke 42.

FIG. 2a is a three-phase, Y-connection diagram showing the windings wound around the teeth of the stator having nine slots of a brushless DC motor of the inner rotor type or outer rotor type, according to a prior art.

The concentric windings are made in series in the following orders: for A phase 50, A1 tooth 11a, A2 tooth 11b, and A3 tooth 11c, for B phase 60, B1 tooth 11d, B2 tooth 11e, and B3 tooth 11f, and for C phase 70, C1 tooth 11g, C2 tooth 11h, and C3 tooth 11i.

As shown in FIG. 2a, each connected winding from the A3 tooth 11c, B3 tooth 11f and C3 tooth 11i is connected together at the neutral point 80 to form a Y-connection.

FIG. 2b is a three-phase, -connection diagram showing the windings wound around the teeth of the stator having nine slots of a brushless DC motor of inner rotor type or outer rotor type, according to a prior art.

The concentric windings are made in series in the following orders: for A phase 50, A1 tooth 11a, A2 tooth 11b, and A3 tooth 11c, for B phase 60, B1 tooth 11d, B2 tooth 11e, and B3 tooth 11f, and for C phase 70, C1 tooth 11g, C2 tooth 11h, and C3 tooth 11i.

As shown in FIG. 2b, each connected winding of A phase, B phase and C phase is connected together to form a -connection.

FIG. 2c is a plan view of a brushless DC motor and magnetic equivalent circuit diagram showing the direction of the magnetic flux flowing through the closed path of flux in an inner-rotor-type brushless DC motor with twelve poles, nine slots and Y-connection, according to a prior art.

As shown in FIG. 2c, the concentric windings of the slotted stator are made in series in the following orders: for A phase, tooth A1, tooth A2, and tooth A3, for B phase, tooth B1, tooth B2, and tooth B3, and for C phase, tooth C1, tooth C2, and tooth C3. In a state of three-phased connections of A phase, B phase and C phase, when currents flow into two of the phases, a flux flows through the closed path. The flux passing through the air gap is determined by the following equation 1.

$$\psi_m = \{N_m I_m/(R_{air}+R_{mag})\} + \{\psi_r R_{mag}/(R_{air}+R_{mag})\} \quad \text{(Equation 1)}$$

$N_m$: number of turns of the main windings
$I_m$: current of the main windings
$R_{air}$: magnetic reluctance of the air gap
$R_{mag}$: magnetic reluctance of the permanent magnets
$\psi_r$: flux output by permanent magnets
NI: magnetomotive force In the above equation, the magnetomotive force induced by main windings 20 is $N_m I_m$, and the magnetomotive force made by permanent magnets is $\psi_r$Rmag.

In the brushless DC motor constructed as described above, the position of the rotor is determined by a sensor such as a hall sensor or an encoder, or a sensorless method of using variations of the back electromotive force or inductance, so that the direction of the current flowing into each phase of being commutated is determined, and a rotating magnetic field is created.

Brushless DC motors of the inner rotor type are easy to control and radiate heat effectively, but have considerable variations of speed because of their small rotating inertia, while brushless DC motors of the outer rotor type have little variations of speed because of their large rotating inertia, but have relatively poor heat radiation.

Recently, as brushless DC motors using permanent magnets made of a neodymium-iron-boron of high coercive force become smaller and thinner, the thickness and height of the permanent magnets have become smaller, and the length and width of the teeth of the stator have become shorter and narrower, resulting in restricting the room for the windings accordingly. This problem has resulted in decreasing the torque constant of the brushless DC motor which is be determined by the windings of the stator and the permanent magnets of the rotor. A decrease in the torque constant brings about a decrease not only in the starting and the driving torque of the brushless DC motor, but also in the efficiency of the brushless DC motor. An example is the ultracompact, low speed spindle motor used in a microdrive, in the range of the operating speed (in case of IBM microdrive, 3600 or 4500 rpm). In particular, in a system which requires low power such as a portable information storage device, low efficiency is an essential problem which shortens the lifetime of the system. Accordingly, there is a need for an ultracompact brushless DC motor having improved starting/driving torque and efficiency, with increasing torque constant.

SUMMARY OF THE INVENTION

The present invention is made to solve above problems. The purpose of the present invention is to provide a brushless DC motor compensated by auxiliary windings wound around the linking parts of each pair of adjacent teeth of the slotted stator to increase the number of effective turns for each phase, thus improving the torque constant and efficiency of the motor.

A characteristic of a brushless DC motor with armature windings compensated by auxiliary windings according to the present invention for attaining the above mentioned technical object is that:

the motor comprises a slotted stator formed with a number of teeth, main windings concentrically wound around the teeth of said stator, auxiliary windings for compensating the main windings wound concentrically around the linking parts of said teeth and connected to said main windings.

DETAILED DESCRIPTION OF THE EMBODIMENTS

The present invention will be described in more detail with reference to the preferred embodiments shown in the attached drawings.

Figure 1A:
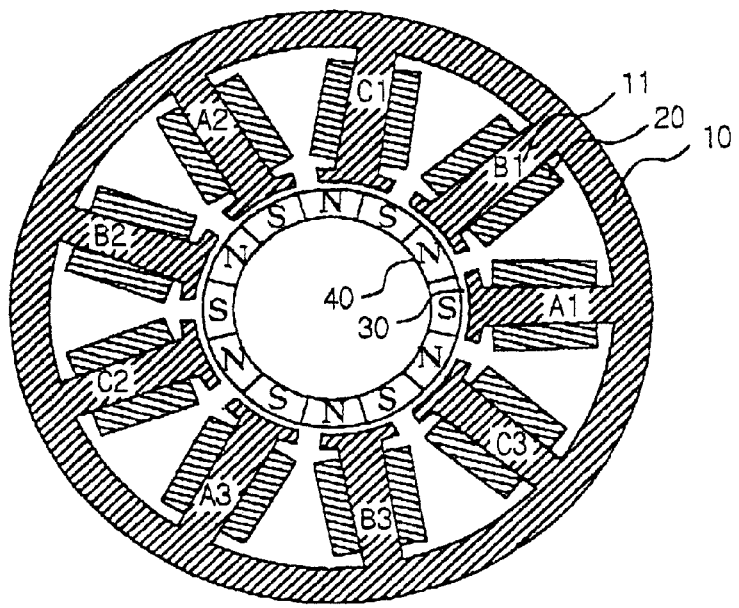
FIG. 1a is a plan view showing a brushless DC motor of the inner rotor type with twelve poles and nine slots according to a prior art.
Figure 1B:
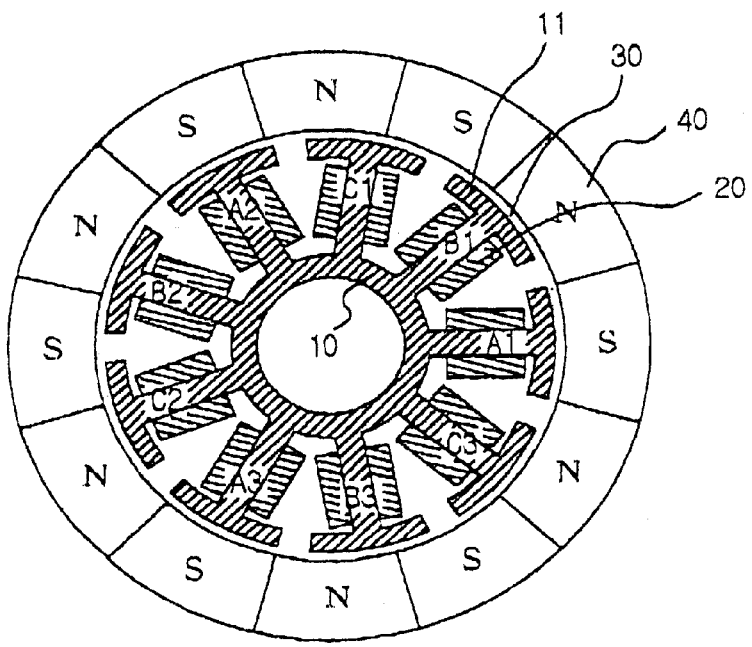
FIG. 1b is a plan view showing a brushless DC motor of the outer rotor type with twelve poles and nine slots according to a prior art.
Figure 2A:
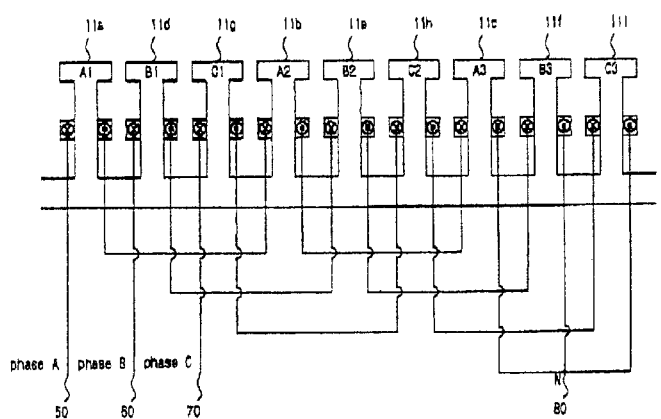
FIG. 2a is a three-phase, Y-connection diagram showing the windings wound around the teeth of the stator having nine slots of a brushless DC motor of either the inner rotor type or the outer rotor type, according to a prior art.
Figure 2A:
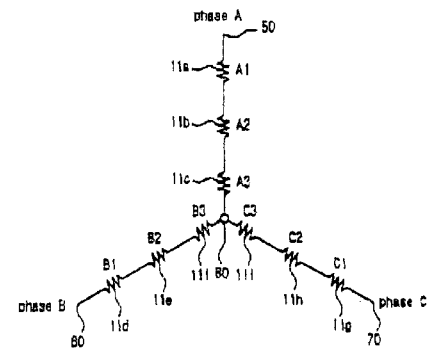
Figure 2B:
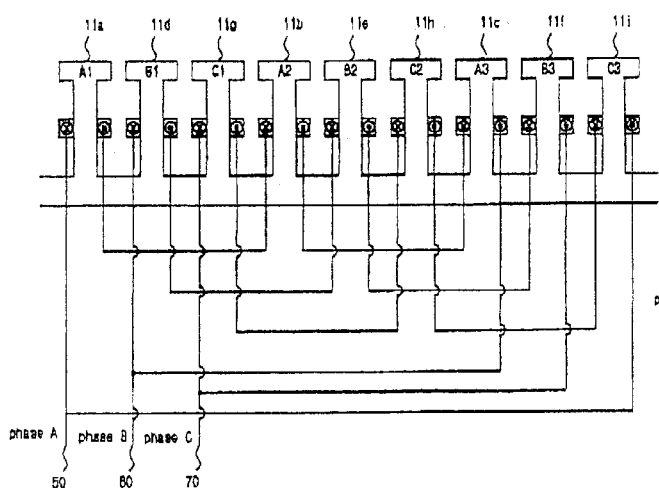
FIG. 2b is a three-phase, -connection diagram showing the windings wound around the teeth of the stator having nine slots of a brushless DC motor of either the inner rotor type or the outer rotor type, according to a prior art.
Figure 2B:
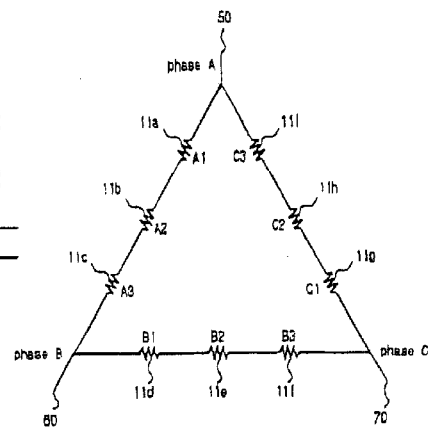
Figure 2C:
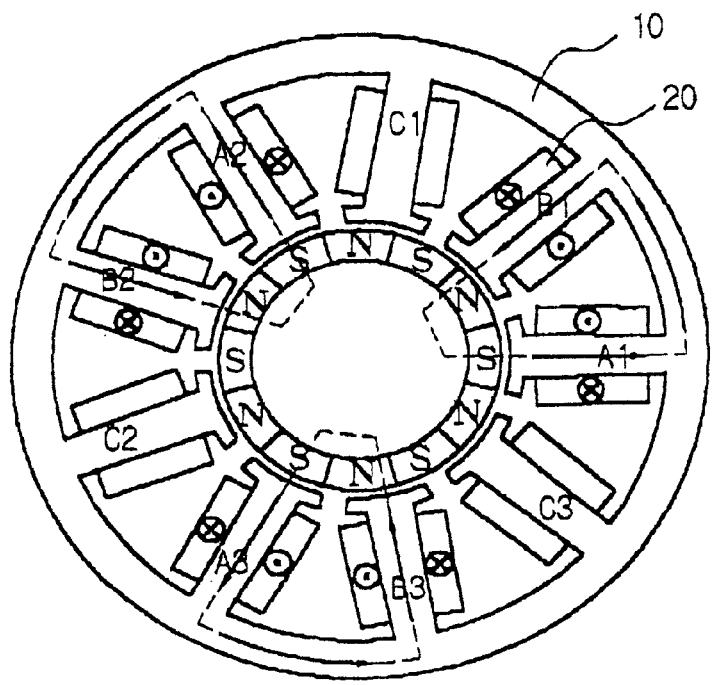
FIG. 2c is a plan view of a brushless DC motor and magnetic equivalent circuit diagram showing the direction of the magnetic flux flowing through the closed path of flux in an inner-rotor-type brushless DC motor with twelve poles, nine slots and Y-connection, according to a prior art
Figure 2C:
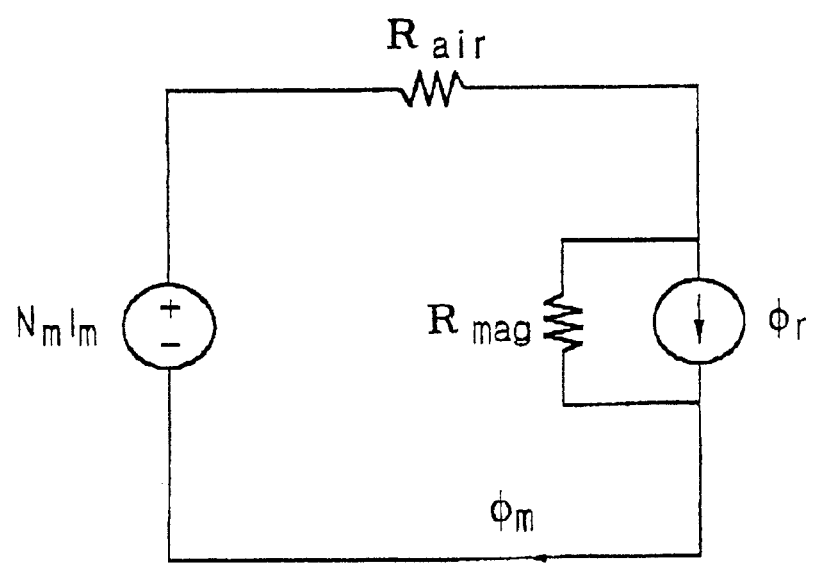
Figure 3A:
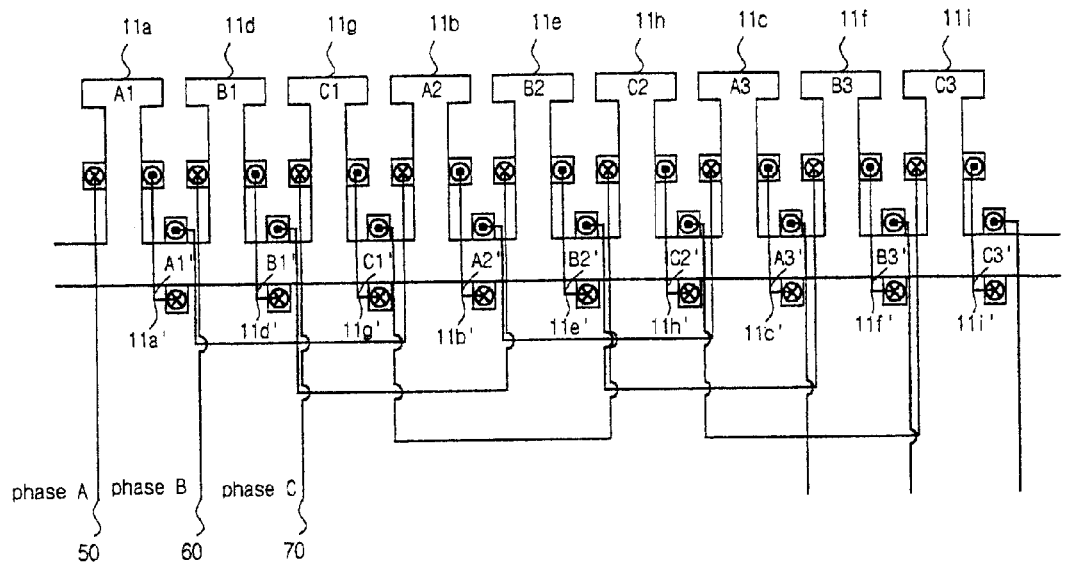
FIG. 3a is a plan view showing the first embodiment of a winding method of main and auxiliary windings of a slotted stator having nine slots of a brushless DC motor of the inner rotor type, according to the present invention.
Figure 3A:
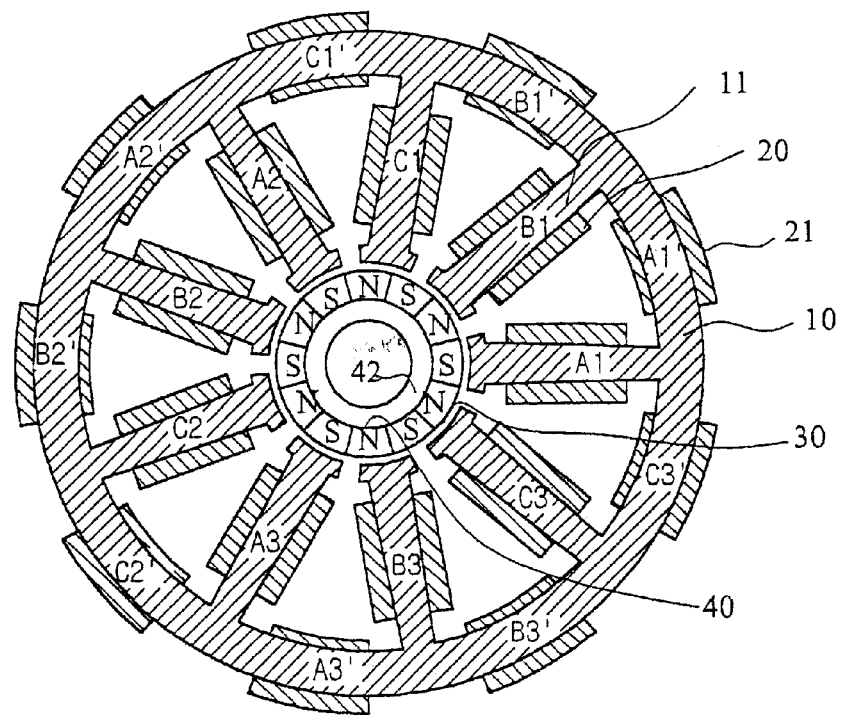

FIG. 3a is a plan view showing the first embodiment of a winding method of the main and auxiliary windings of a slotted stator having nine slots of a brushless DC motor of the inner rotor type, according to the present invention.

As shown in FIG. 3a, a brushless DC motor with armature windings compensated by auxiliary windings according to the present invention mainly comprises a slotted stator 10 with nine teeth 11, main windings 20 and auxiliary windings 21, and a rotor 40 with permanent magnets 41 and a yoke 42, and air gaps 30 between the rotor and the stator.

The slotted stator 10 includes nine teeth 11 linked together to make a closed path of flux, main windings 20 wound around the nine teeth 11, and auxiliary windings 21 wound around the linking parts of each pair of adjacent teeth 11 of the slotted stator 10, and the rotor 40 includes twelve poles of permanent magnets 41 with opposite poles disposed alternately on the circumference of the yoke 42.

Next, a winding method of the main windings 20 and the auxiliary windings 21 of the stator 10 will be described.

The concentric windings are made in series in the following orders: for A phase 50, A1 tooth 11a, A1' linking part 11a', A2 tooth 11b, A2' linking part 11b+, A3 tooth 11c, and A3' linking part 11c'; for B phase 60, B1 tooth 11d, B1' linking part 11d', B2 tooth 11e, B2' linking part 11e', B3 tooth 11f, and B3' linking part 11f; and for C phase 70, C1 tooth 11g, C1'linking part 11g', B2 tooth 11h, B2'linking part 11h', B3 tooth 11i, and B3' linking part 11i'.

Figure 3B:
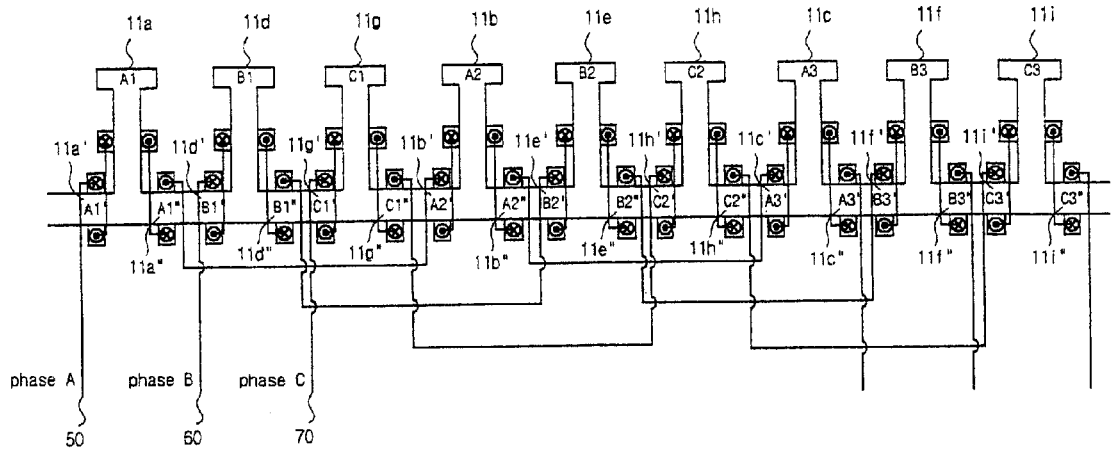
FIG. 3b is a plan view showing the second embodiment of a winding method of main and auxiliary windings of a slotted stator having nine slots of a brushless DC motor of the inner rotor type, according to the present invention.
Figure 3B:
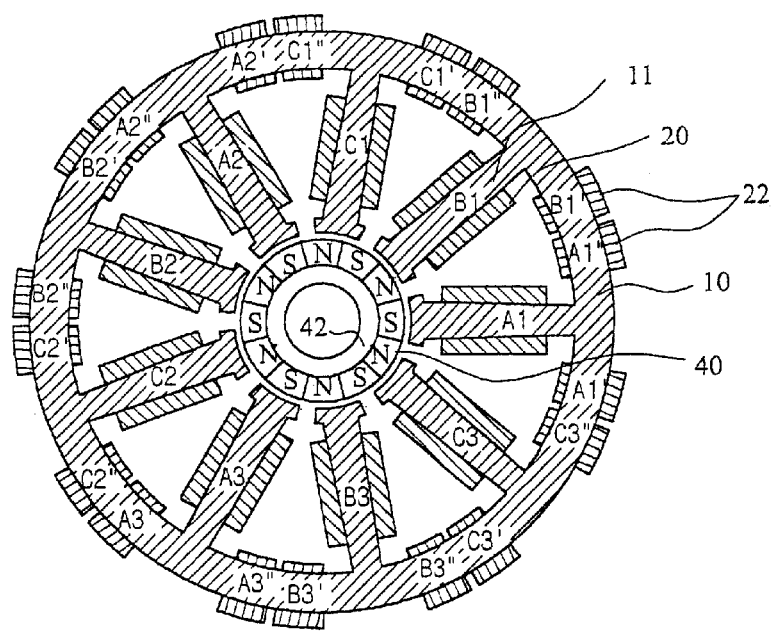

FIG. 3b is a plan view showing the second embodiment of a winding method of main and auxiliary windings of a slotted stator having nine slots of a brushless DC motor of the inner rotor type, according to the present invention.

As shown in FIG. 3b, a brushless DC motor with armature windings compensated by auxiliary windings according to the present invention mainly comprises a slotted stator 10 with nine teeth 11, main windings 20 and auxiliary windings 21, and a rotor 40 of permanent magnets.

The slotted stator 10 includes nine teeth linked together to make a closed path of flux, main windings 20 wound around the nine teeth 11, and auxiliary windings 21 wound separately into two sections around the linking parts of each pair of adjacent teeth 11 of the slotted stator 10, and the rotor 40 includes twelve poles of permanent magnets 41 with opposite poles disposed alternately on the circumference of the yoke 42.

Another winding method of the main windings 20 and the auxiliary windings 21 of the stator 10 will be described.

The concentric windings are made in series in the following orders: for A phase 50, A1 tooth 11*a*, A1' linking part 11*a*', A1" linking part 11*a*", A2 tooth 11*b*, A2' linking part 11*b*', A2" linking part 11*b*", and A3 tooth 11*c*, A3' linking part 11*c*', and A3" linking part 11*c*"; for B phase 60, B1 tooth 11*d*, B1' linking part 11*d*', B1" linking part 11*d*", B2 tooth 11*e*, B2' linking part 11*e*', B2" linking part 11*e*", B3 tooth 11*f*, B3' linking part 11*f*, and B3" linking part 11*f*'; and for C phase 70, C1 tooth 11*g*, C1' linking part 11*g*', C1" linking part 11*g*", C2 tooth 11*h*, C2'linking part 11*h*', C2" linking part 11*h*", C3 tooth 11*i*, C3' linking part 11*i*, and C3" linking part 11*i*".

In the above, the auxiliary windings 22 are wound around the A1" linking part 11*a*", A2" linking part 11*b*", A3" linking part 11*c*", B1" linking part 11*d*", B2" linking part 11*e*", B3" linking part 11*f*", C1" linking part 11*g*", C2" linking part 11*h*", and C3" tooth 11*i*" in the opposite direction with respect to the windings around the A1' linking part 11*a*', A2' linking part 11*b*', A3' linking part 11*c*', B1' linking part 11*d*', B2' linking part 11*e*', B3' linking part 11*f*, C1' linking part 11*g*', C2' linking part 11*h*', and C3' tooth 11*i*'.

Figure 3C:
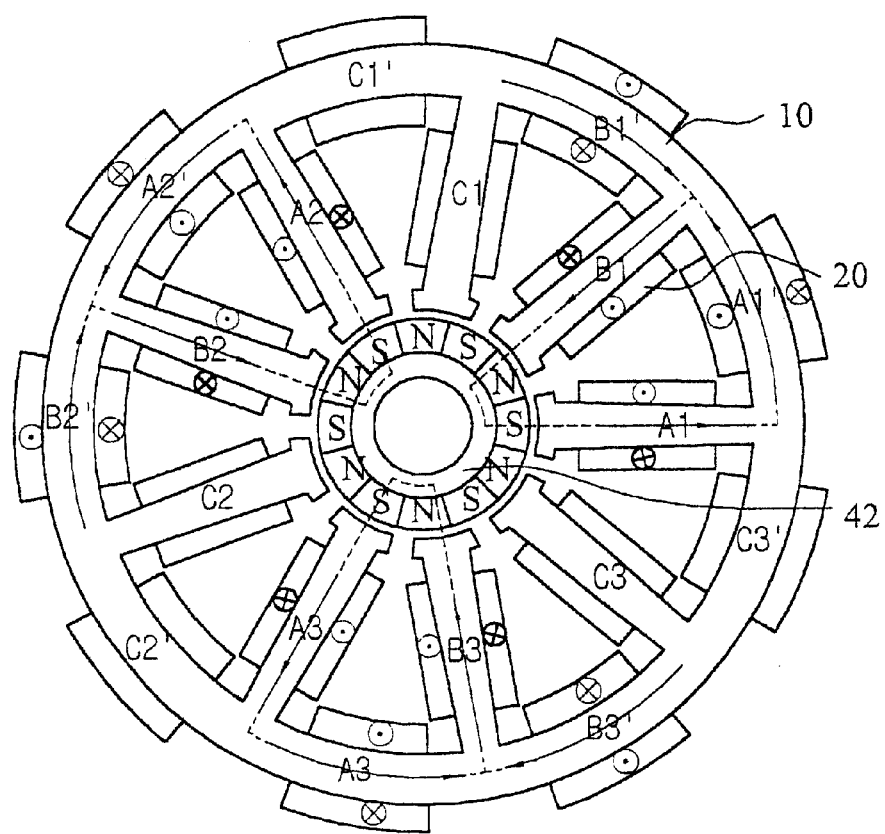
FIG. 3c is a plan view and magnetic equivalent circuit diagram showing the direction of the magnetic flux flowing through the closed path of flux in an inner-rotor-type brushless DC motor with twelve poles, nine slots and Y-connection, compensated by auxiliary windings, according to the present invention.
Figure 3C:
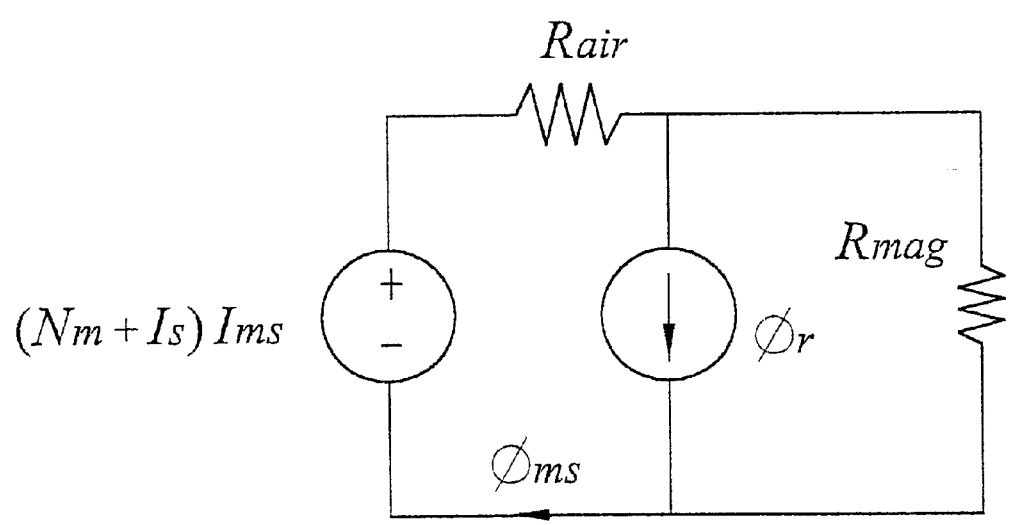

FIG. 3*c* is a plan view and magnetic equivalent circuit diagram showing the direction of the magnetic flux flowing through the closed path of flux in an inner-rotor-type brushless DC motor with twelve poles, nine slots and Y-connection, compensated by auxiliary windings, according to the present invention.

As shown in FIG. 3*c*, the concentric windings of the slotted stator are made in series in the following orders: for A phase, tooth A1, linking part A1', tooth A2, linking part A2', tooth A3, and linking part A3', for B phase, tooth B1, linking part B1', tooth B2, linking part B2', tooth B3, and linking part B3', and for C phase, tooth C1, linking part C1', tooth C2, linking part C2', tooth C3, and linking part C3'. In a state of three-phased connections of A phase, B phase and C phase, when currents flow into two of the three phases, a flux flows through the closed path. The flux passing through the air gap is determined by the following equation 2.

$$\psi_m = \{(N_m + N_s)I_{ms}/(R_{air} + R_{mag}) + \psi_r R_{mag}/(R_{air} + R_{mag})\} \quad \text{(Equation 2)}$$

$N_m$: number of turns of the main windings
$N_s$: number of turns of the auxiliary windings
$I_{ms}$: current of the main and auxiliary windings
$R_{air}$: magnetic reluctance of the air gap
$R_{mag}$: magnetic reluctance of the permanent magnet
$\psi_r$: flux output by permanent magnets
NI: magnetomotive force In the above equation, as the magnetomotive force from windings is an added value $(N_m + N_s) I_{ms}$ of the force $N_m I_{ms}$ induced by main windings 20 and the force $N_s I_{ms}$ induced by auxiliary windings 21, the effective flux increases, resulting in an increased magnetic flux density B.

$$T = (1/\mu_0) \int_r (B_r B_e) dA \quad \text{(Equation 3)}$$

r: radius
$\mu_0$: permeability of air
$B_r$: magnetic flux density in the radial direction
Bθ: magnetic flux density in the tangent direction Equation 3 represents the torque in a cylindrical coordinate system. The torque increases as magnetic flux density increases due to an increase of the effective flux in the air gap.

Figure 4:
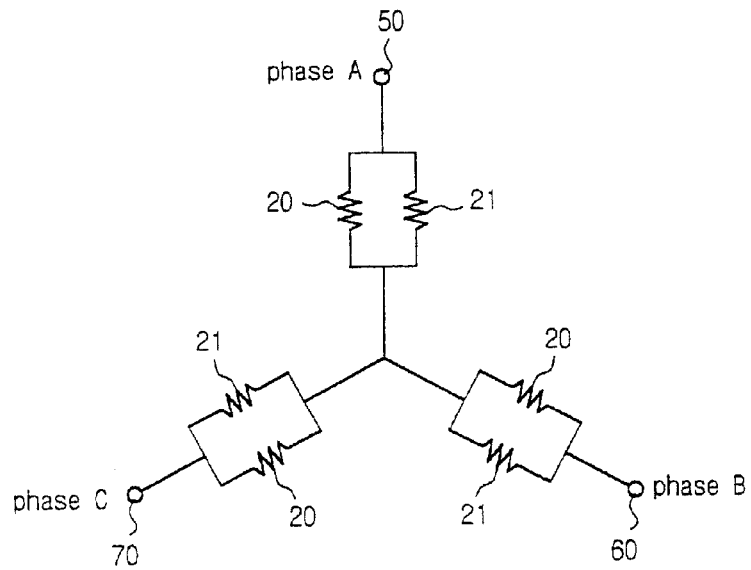
FIG. 4 is a Y-connection diagram showing the third embodiment of a winding method of auxiliary windings wound in parallel to main windings, according to the present invention.

FIG. 4 is a Y-connection diagram showing the third embodiment of a winding method of auxiliary windings wound in parallel to main windings, according to the present invention.

As shown in FIG. 4, main and auxiliary windings having the same value of resistance are connected in parallel.

As the main and auxiliary windings are connected in parallel, the combined resistance of two phases selected from the A phase, B phase, and C phase is decreased by ¼, compared with that in the case of series connection. Accordingly, the current flowing into the main and auxiliary windings is doubled, thus producing the large starting torque of a brushless DC motor.

To study validity of the winding method for the slotted stator of the brushless DC motor, a numerical simulation was performed using a finite elemental method. A brushless DC motor for an IBM microdrive, developed as an information storage device, was used as a simulation model. As the IBM microdrive having a height of 5.0 mm, a width of 42.8 mm, and a length of 36.4 mm includes a brushless DC motor, disk, and controlling PCB, improvement of torque constant in an ultracompact system, in which the size of the motor is considerably restricted, is the most important objective in the design of a motor. The main specifications of a brushless DC motor for the IBM microdrive are shown in Table 1.

TABLE 1

| Main specifications of brushless DC motor of IBM microdrive | |
|---|---|
| Inside diameter of stator | 9.6 mm |
| Outside diameter of stator | 17.57 mm |
| Thickness of stator | 1.0 mm |
| Inside diameter of rotor | 5.0 mm |
| Outside diameter of rotor | 9.4 mm |
| Air gap length | 0.2 mm |
| Thickness of permanent magnets | 1.45 mm |
| Residual flux density of permanent magnets | 0.7 T |
| Number of poles | 12 |
| Number of slots | 9 |

(1) With the first and second embodiment of the present invention mentioned herein, the ability to improve the torque constant of compensating auxiliary windings or bydivided auxiliary windings will be described in detail, referring to FIG. 5.

Figure 5:
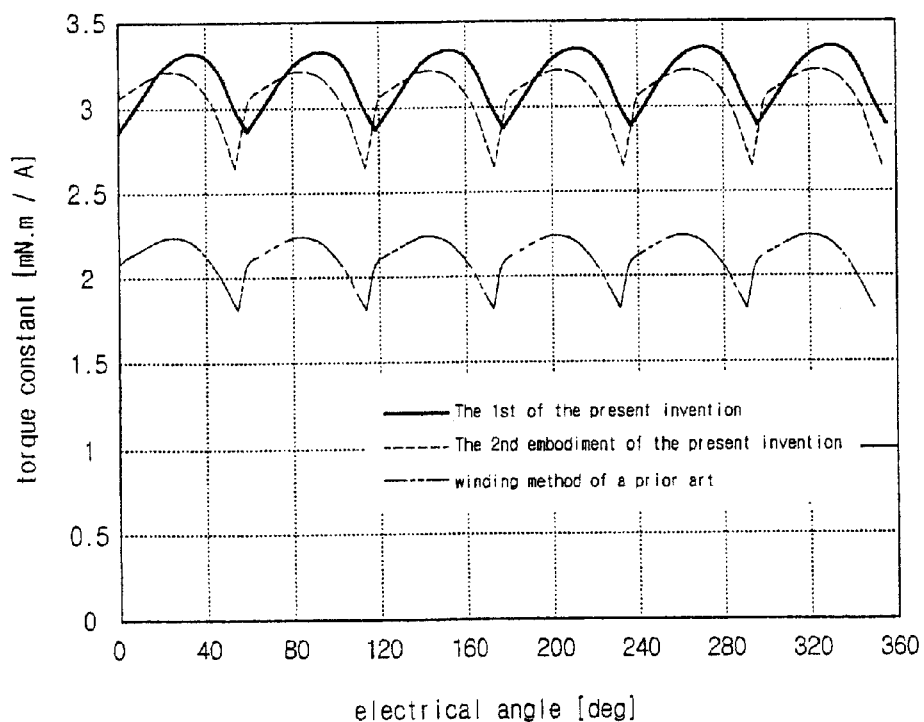
FIG. 5 is a graph showing a comparison between the torque constant of the armature windings of a brushless DC motor according to a prior art, and that of the armature windings compensated by auxiliary windings of a brushless DC motor according to the present invention.

FIG. 5 is a graph showing a comparison between the torque constant of the armature windings of a brushless DC motor according to a prior art, and that of the armature windings compensated by auxiliary windings of a brushless DC motor according to the present invention. In the case of the winding method provided in the first embodiment of the present invention, the numbers of turns of the main and auxiliary windings are 100 and 90 respectively.

Also, in the case of the winding method provided in the second embodiment of the present invention, the number of turns of the main windings is 100 and the number of turns of each divided auxiliary windings wound around a pair of adjacent linking parts is 45.

As shown in FIG. 5, the abscissa shows the electrical angle, and the ordinate shows the torque constant.

By the finite element method mentioned above, the peak value of the torque constant of a brushless DC motor was calculated as 2.249[mN·m/A] in the winding method of a prior art, 3.350[mN·m/A] in that of the first embodiment of the present invention, and 3.232[mN·m/A] in that of the second embodiment of the present invention.

Also, by the finite element method mentioned above, the average value of the torque constant of a brushless DC motor was calculated as 2.128[mN·N m/A] in the winding method of a prior art, 3.162[mN·m/A] in that of the first embodiment of the present invention, and 3.081[mN·m/A] in that of the second embodiment of the present invention.

The ripple percentage of the torque constant was determined by equation 4 below, based on the peak and average values of the torque constant. The result is shown in Table 2.

Ripple percentage=peak-to-peak value/average value (Equation 4)

TABLE 2

Peak value, average value, and ripple percentage of torque constant

| Winding method | Peak value [mN·m/A] | Average value [mN·m/A] | Ripple percentage [%] |
|---|---|---|---|
| Prior art | 2.249 | 2.128 | 19.50 |
| The first embodiment of the present invention | 3.350 | 3.162 | 15.15 |
| The second embodiment of the present invention | 3.232 | 3.081 | 18.54 |

As shown in Table 2, the average value of the torque constant in the winding method of the first embodiment of the present invention increases by 1.49 times, and in the winding method of the second embodiment of the present invention by 1.44 times, compared with that of a prior art.

(2) Using the first embodiment of the present invention mentioned above, the improvement of the torque and efficiency of the motor due to the number of turns and the diameter of the copper-wire of the auxiliary windings will be described in detail, referring to Table 3, FIG. 6 and FIG. 7.

Table 3 shows comparison data of resistance of two phases, current, torque, torque constant, and efficiency due to the variations of the number of turns and the diameter of the copper-wire of the auxiliary windings when terminal voltage is 3.3V. The number of turns and the diameter of the copper-wire of the auxiliary windings are adjusted to have the same height of the main windings.

TABLE 3

Electrical characteristics due to the variations of the number of turns and the diameter of the copper-wire

|  | 1 | 2 | 3 | 4 | 5 |
|---|---|---|---|---|---|
| Number of turns of main windings | 100 | 100 | 100 | 100 | 100 |
| Number of turns of auxiliary windings |  | 90 | 56 | 52 | 48 |
| Diameter of the copper-wire of the main windings (mm) | 0.07 | 0.07 | 0.07 | 0.07 | 0.07 |
| Diameter of the copper-wire of the auxiliary windings (mm) |  | 0.10 | 0.11 | 0.12 | 0.13 |
| Resistance of main windings in two phases (Ω) | 14.7687 | 14.7687 | 14.7687 | 14.7687 | 14.7687 |
| Resistance of auxiliary windings in two phases (Ω) |  | 6.0339 | 2.8896 | 2.2867 | 1.8238 |
| Resistance in two phases (Ω) | 14.7687 | 20.8026 | 17.6584 | 17.0555 | 16.5925 |
| Current (A) | 0.2234 | 0.1586 | 0.1869 | 0.1935 | 0.1989 |
| Torque (mN·m) | 0.4752 | 0.5014 | 0.5061 | 0.5160 | 0.5221 |
| Torque constant (mN·m/A) | 2.1283 | 3.1622 | 2.7091 | 2.6677 | 2.6262 |
| Efficiency at 3600 rpm (%) | 23.5617 | 34.1985 | 29.6179 | 29.1938 | 28.664 |
| Efficiency at 4500 rpm (%) | 29.1265 | 41.7299 | 36.3859 | 35.8837 | 35.3765 |

As shown in Table 3, if the diameter of the copper-wire of the auxiliary windings increases while the number of turns of the main windings is fixed at 100, both torque and torque constant can increase. The efficiency($\eta$) of the motor was determined on the assumption that the no load current is 10% of the operating current, using the following equation 5.

Efficiency of motor($\eta$)={(starting torque of motor)×(rotating speed of motor)/(applied voltage of motor)×(applied current of motor)}=$T_\omega$/VI (Equation 5)

For example, when the numbers of turns of the main and auxiliary windings are 100 and 90 respectively, the efficiency increased by 1.45 times at the operating speed of 3600 rpm, and by 1.43 times at the operating speed of 4500 rpm, compared with the results when the numbers of turns of the main and auxiliary windings are 100 and 0 respectively.

Figure 6:
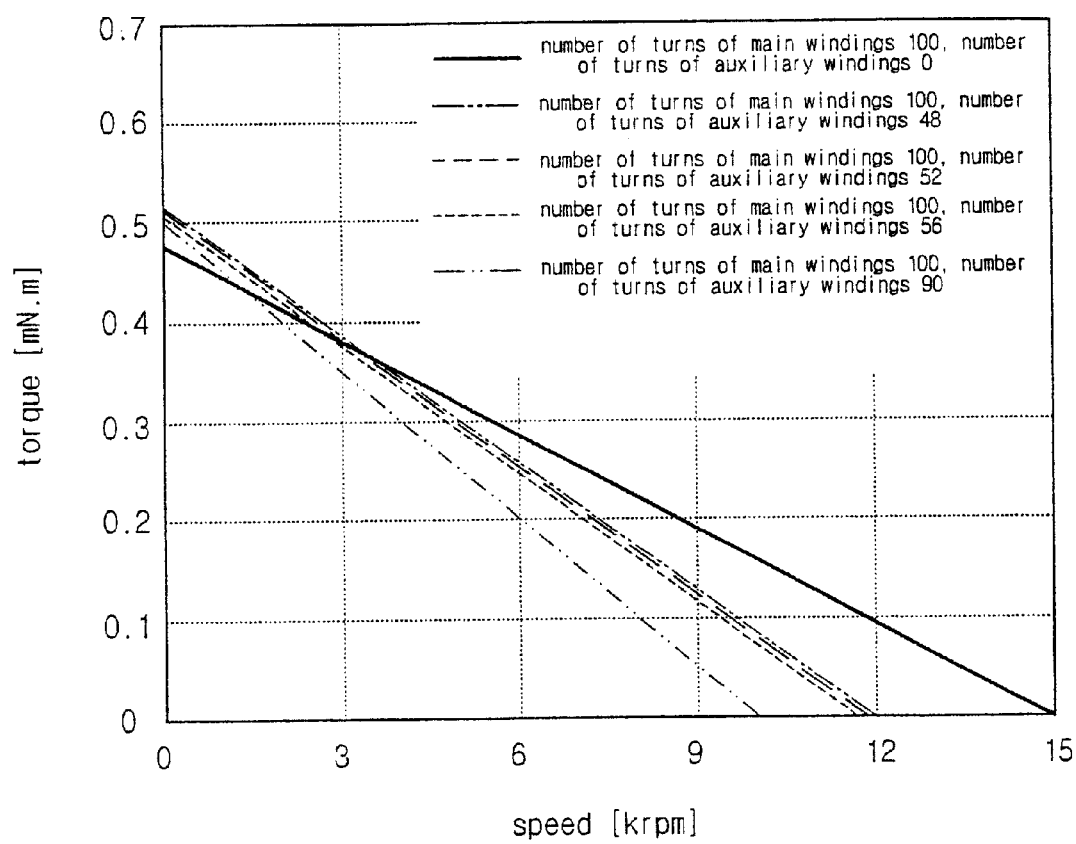
FIG. 6 is a characteristic curve of speed-torque, due to the variations of the number of turns of auxiliary windings and the diameter of the copper-wire, according to the first embodiment of the present invention.

FIG. 6 is a characteristic curve of speed-torque, due to the variations of the number of turns of auxiliary windings and the diameter of the copper-wire, according to the first embodiment of the present invention.

As shown in FIG. 6, when the number of turns of the main windings is fixed at 100, and the number of turns of the auxiliary windings is varied to 48, 52, 56, and 90 with changes in the diameter of the copper-wire, the gradient of the characteristic curves of driving speed-torque becomes steeper in that order, than when the numbers of turns of the main and auxiliary windings are 100 and 0 respectively. Thus, a higher starting torque and torque constant can be obtained.

Figure 7:
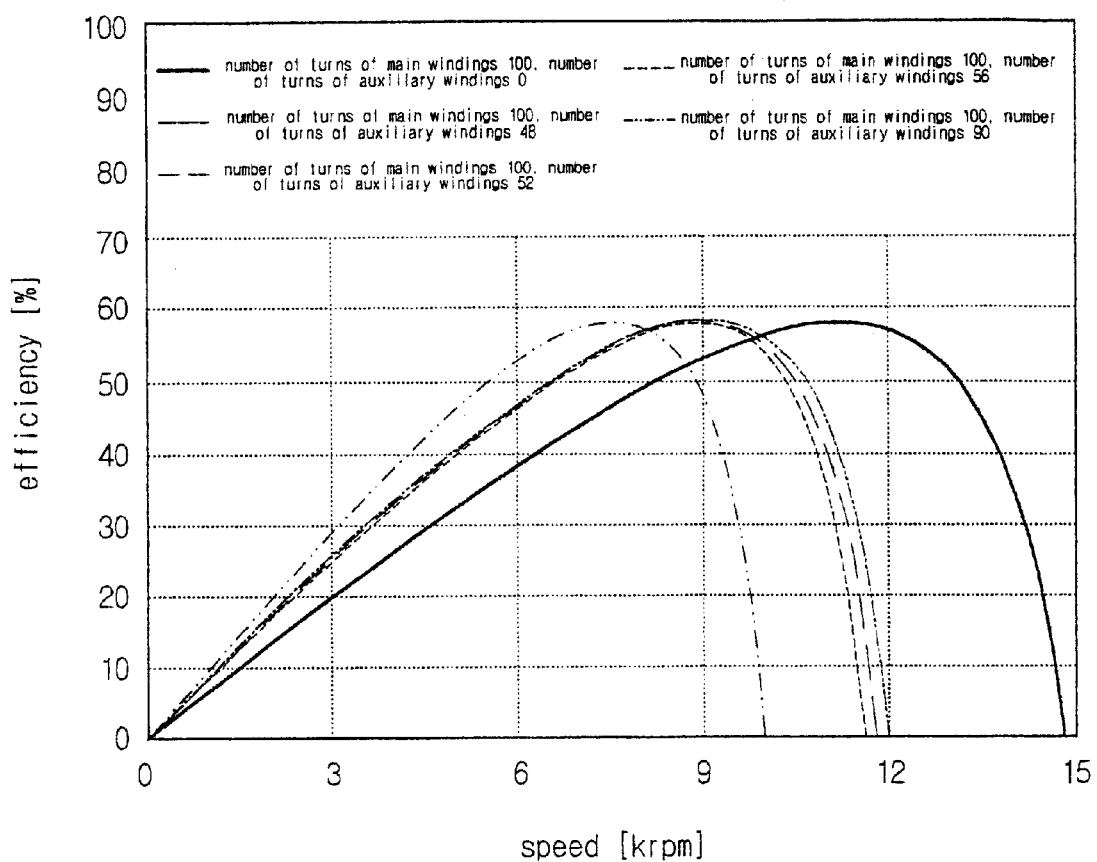
FIG. 7 is a characteristic curve of speed-efficiency, due to the variations of the number of turns of auxiliary windings and the diameter of the copper-wire, according to the first embodiment of the present invention.

FIG. 7 is a characteristic curve of speed-efficiency, due to the variations of the number of turns of auxiliary windings and the diameter of the copper-wire, according to the first embodiment of the present invention.

As shown in FIG. 7, when the number of turns of the main windings is fixed at 100, and the number of turns of the auxiliary windings is varied to 48, 52, 56, and 90 with changes in the diameter of the copper-wire, the efficiency of the motor in the operating speed of 3,600 rpm and 4,500 rpm can increase more than when the numbers of turns of the main and auxiliary windings are 100 and 0 respectively.

(3) With the third embodiment of the present invention mentioned above, improvement of the starting torque with the parallel connections of main windings and auxiliary windings will be described in detail, referring to Table 4.

Table 4 shows comparison data of resistance, current and torque when the main windings and the auxiliary windings are connected in parallel.

TABLE 4

Electrical characteristics due to the parallel connections of main windings

|  | 1 | 2 | 3 |
|---|---|---|---|
| Number of turns of main windings | 100 | 100 | 100 |
| Number of turns of auxiliary windings |  | 140 | 120 |
| Diameter of the copper-wire of the main windings (mm) | 0.07 | 0.07 | 0.07 |

TABLE 4-continued

Electrical characteristics due to
the parallel connections of main windings

|  | 1 | 2 | 3 |
|---|---|---|---|
| Diameter of the copper-wire of the auxiliary windings (mm) | 0.07 | 0.07 | 0.08 |
| Resistance of main windings in one phase ($\Omega$) | 7.3844 | 7.3844 | 7.3844 |
| Resistance of auxiliary windings in one phase ($\Omega$) |  | 9.5309 | 6.4252 |
| Resistance in two phases ($\Omega$) | 14.7687 | 8.3214 | 7.1091 |
| Current of main windings (A) | 0.2234 | 0.2234 | 0.2234 |
| Current of auxiliary windings (A) |  | 0.1731 | 0.2408 |
| Torque (mN·m) | 0.4752 | 0.7533 | 0.8283 |

As shown in Table 4, when the number of turns of the auxiliary windings increases to 120 and 140 respectively, and the number of turns of the main windings is fixed at 100, the average value of torque increases by 1.74 times, and by 1.58 times, respectively.

As described above, the present invention has advantages of improving torque constant and the efficiency of a motor by including auxiliary windings and by changing the diameter of the copper-wire of the auxiliary windings. It also improves the starting torque of the motor by the parallel connections of the main windings and the auxiliary windings. While the preferred embodiments of the present invention have been described herein referring to the drawings, it should be understood that other modifications, substitutions and alternatives may be apparent to one of ordinary skill in the art. Such modifications, substitutions and alternatives can be made without departing from the spirit and scope of the present invention, which should be determined from the appended claims.

What is claimed is:

1. A brushless DC motor with armature windings compensated by auxiliary windings comprising:

a slotted stator formed with a number of teeth, main windings concentrically wound around said teeth, a rotor with permanent magnets and a yoke, and auxiliary windings wound concentrically around linking parts of said slotted stator between adjacent said teeth and connected to said main windings.

2. The brushless DC motor with armature windings compensated by auxiliary windings according to claim 1, wherein said auxiliary windings are wound around the linking parts of each pair of adjacent teeth of said slotted stator, in several divided sections between each pair of adjacent teeth, with alternate connection one after another in the forward and inverse direction.

3. The brushless DC motor with armature windings compensated by auxiliary windings according to claim 1, wherein said auxiliary windings are connected in series.

4. The brushless DC motor with armature windings compensated by auxiliary windings according to claim 1, wherein said auxiliary windings are connected in parallel.

5. The brushless DC motor with armature windings compensated by auxiliary windings according to claim 1, wherein said auxiliary windings are arranged perpendicularly to said main windings.

6. The brushless DC motor with armature windings compensated by auxiliary windings according to claim 1, wherein said auxiliary windings and said main windings are connected in a circuit during motor start up.

\* \* \* \* \*